United States Patent [19]
Paasschens et al.

[11] 3,781,000
[45] Dec. 25, 1973

[54] SPRING AND BOSS SPARGER-MOUNTING

[75] Inventors: Cornelis W. Paasschens, Schwalbach/Taunus, Germany; Victor J. Nelson, Naperville, Ill.

[73] Assignee: Chicago Bridge & Iron Company, Aurora, Ill.

[22] Filed: Oct. 18, 1971

[21] Appl. No.: 190,364

Related U.S. Application Data
[63] Continuation of Ser. No. 845,377, July 28, 1969, abandoned.

[52] U.S. Cl. ............................................... 261/124
[51] Int. Cl. ................................................. B01f 3/04
[58] Field of Search ..................................... 261/124

[56] References Cited
UNITED STATES PATENTS
3,501,133  3/1970  Dreier et al. .................... 261/124
3,242,072  3/1966  Walker .............................. 261/124

Primary Examiner—Tim R. Miles
Attorney—Howard H. Darbo et al.

[57] ABSTRACT

A single or double sparger unit is held accurately positioned on a header by the combination of a boss formed on the saddle portion of the sparger unit, and which projects into an aperture in the header through which air is supplied to the sparger unit, and a spring system embracing the header and drawing the sparger unit into sealed relationship with the header. A saddle shaped portion of the sparger unit, surrounding the boss, engages the header through a sealing gasket. The spring system includes one or more stainless steel spring fasteners. Each fastener includes a band with a spring at each end hooked through a hole in the band and hooked to the sparger unit.

5 Claims, 5 Drawing Figures

PATENTED DEC 25 1973 3,781,000
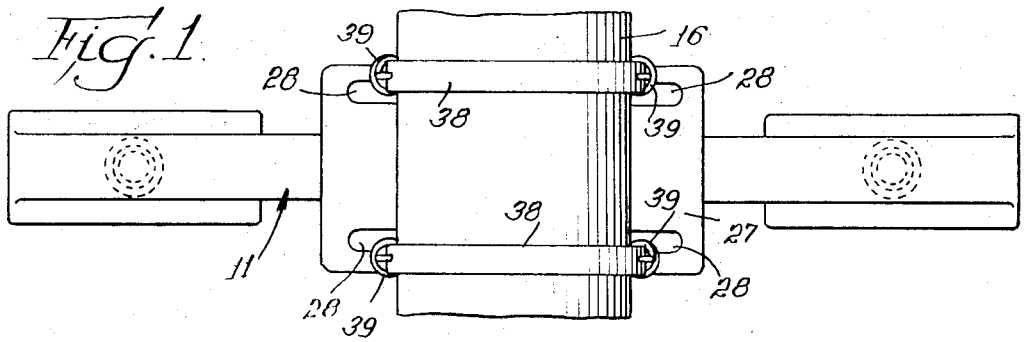
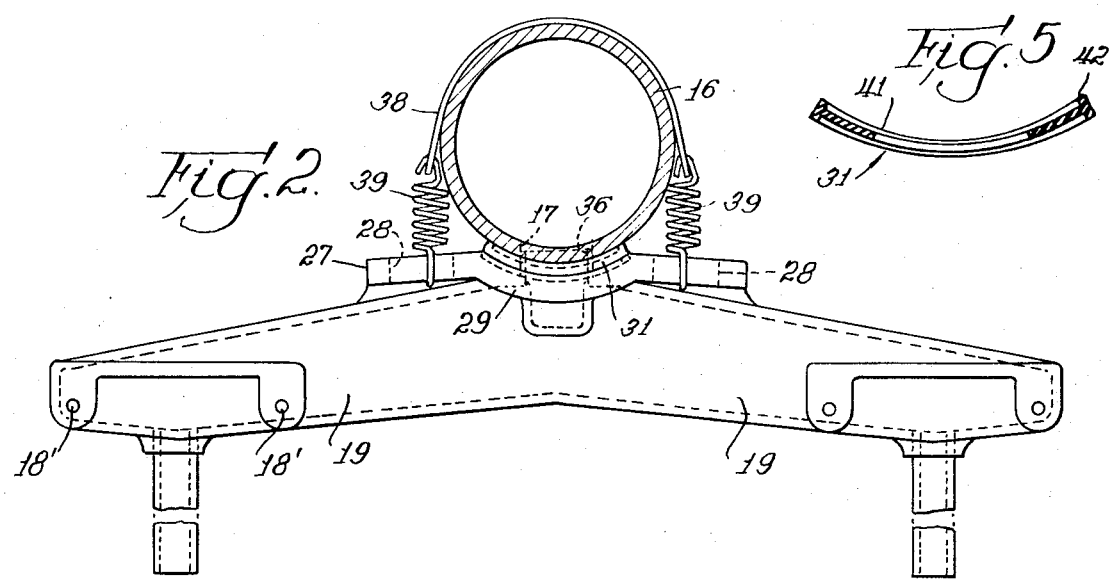
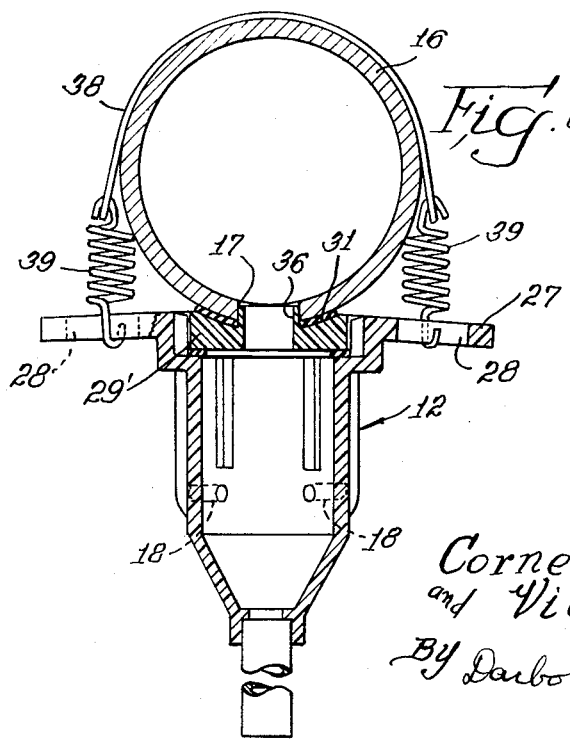
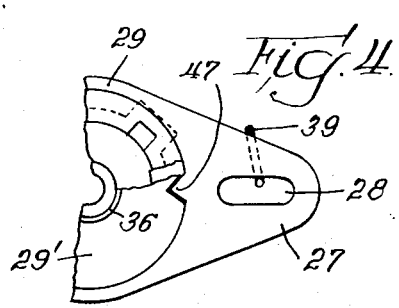
Inventors
Cornelis W. M. Paasschens
and Victor J. Nelson
BY Darbo, Robertson & Vandenburgh
Att'ys

SPRING AND BOSS SPARGER-MOUNTING

This is a continuation of application Ser. No. 845,377 filed July 28, 1969 now abandoned.

In the past, the most economical satisfactory method of securing spargers to headers has been by the use of U-bolts. One or two U-bolts would draw the sparger unit with its gasket into sealing relationship with the header. This mounting system has been very extensively used, but it was not free from faults. One fault was a difficulty in accurately positioning the sparger. This could be serious if misalignment of holes caused decreased flow. The necessity of screwing two or four pairs of nuts on the U-bolt or bolts represented an appreciable expense, and of course this aspect of the expense of assembly of the spargers on a header was increased by every mistake in positioning which had to be corrected. Nevertheless, this mounting system was less expensive than the alternative heretofore present of welding threaded bosses to the headers and providing a threaded extension on each sparger.

Another serious fault was in failure to tighten the U-bolts within a permissible range of tightness. If too loose, the sparger was likely to shift its position, or there could be air leakage at the gasket. Workers conscientiously tightening the U-bolts enough to be sure not to encounter these faults, were likely to tighten them too much, causing breakage. Delayed failure would be worse than immediate failure.

All of these prior faults are overcome by using the spring and boss mountings of the present invention. The spring system can be designed to give the right sealing pressure invariably. The inter-fitting of the boss on the sparger unit with the hole in the header positively prevents any shifting of the sparger unit as a whole with respect to the header. Any improper angularity at the position determined by the boss is prevented by the saddle type engagement between the sparger unit and the header. The cylindrical surface of the saddle cooperates with the cylindrical outer surface of the header through the intervening gasket to ensure proper alignment.

Additional objects and advantages of the invention may be seen from the following description and from the drawings.

DESIGNATION OF FIGURES

FIG. 1 is a plan view of a segment of the header with a double sparger secured thereto according to the present invention.

FIG. 2 is a vertical sectional view through the header, showing the sparger unit and one of the spring systems securing it in place.

FIG. 3 is a view similar to FIG. 2 but showing a single sparger instead of the double sparger of FIG. 2.

FIG. 4 is a fragmentary view looking down at the top of a sparger unit of FIG. 3, with parts broken away to show different details.

FIG. 5 is a vertical sectional view through a gasket used in FIGS. 1 and 2.

BACKGROUND DESCRIPTION

The present invention is concerned with systems (such as are used in sewage aeration) in which sparger units 11 on 12 are secured to horizontal headers 16. Usually each header 16 will have several or numerous spargers secured to it. At each sparager position, the header is provied with a hole 17. Air supplied to the header by supply pipes (not shown) passes through the hole 17 into the sparger 11 or 12. In the case of the single sparger 12, the air, or some of it, passes out through four primary orifices 18, two of which are indicated in FIG. 3. In the case of the double sparger shown in FIGS. 1 and 2, air from heater 16 flows through ach of two arms 19, each of which carries at its end a sparger cluster comprising four orifices 18' of which two are visible in FIG. 2. The sparger units illustrated are the subject of a separate application and are commercially known so that they need not be described in further detail. THe present invention is concerned with the mounting of the spargers. In some respects even the mounting details are old. Thus the illustrated spargers are provided with wings 27 having slots 28 which were originally designed to receive V-bolts. The wings are extensions of saddle portions 29 which conform more or less to the contour of headers 16. A gasket of some sort such as gaskets 31 and 31' have formed a seal around the sperture 17 to prevent the escape of air so that air would flow only into the sparger unit.

SPRING AND BOSS MOUNTINGS

According to the present invention, each sparger unit is provided with a boss 36 (or other guide projection) extending into the aperture 17 of the header. This, in cooperation with the saddle 29, which includes the saddle insert 29' in the case of the single sparger, accurately positions the sparger unit on the header, assuming that each sparger unit is drawn firmly toward the header. In this instance each sparger unit is drawn firmly toward the header by a spring system including a band 38 having hooked to each end thereof a coil spring 39. Each coil spring in turn hooks through or into one of the slots 28. In the case of the double spargers of FIGS. 1 and 2, there are two fasteners each comprising one strap 38 and two springs 39.

Preferably all parts of the spring system are made of stainless steel. Straps having a thickness of 0.032 inch and a width of five-eighths inch have been found suitable. Springs having an outside diameter of three-fourths inch, eight and a half turns, and developing 45 pounds pull per inch of strength have been found suitable. For snugness adjacent the header each spring preferably has its hook at one end formed of a rather sharp V shape, the hook at the other end being arcuate and sufficiently open to hook around the side of wing 27 and into slot 28.

The length of the straps will vary according to the diameter of the header. Preferably all of the springs are the same, those used having an effective relaxed length of 2 inches, from the insides of the hooks. The straps for 3 inch headers may be of a length for providing the holes spaced at 5 and one-half inch, those for 4 inch headers providing the holes spaced at 7 and one-sixteenth inch, etc.

Drainage of headers is important, and hence the boss 36 should not obstruct flow of water from the bottoms of the headers. With the spargers in the preferred positions at the bottom of the header, as shown, the cylindrical boss 36 should not extend higher than to be tangent with the inside surface of the header at its bottom. Although shapes other than cylindrical could be used, a cylindrical boss of very thin wall thickness, 0.05 inch has been found satisfactory when using the preferred plastic material acrylonitrile-butadine-styrene-polymer.

In the case of the double sparger, it is important to have the sparger horizontally disposed accurately so that its offset orifices 18' will all be at the same height. To this end, the saddle 29 of sparger 11 should rest firmly along well spaced lines. To this end its gasket 31 is rectangular and provided on at least one face with a peripheral rib 41 (FIG. 5). If used on a header 16 of smaller diameter than matches its saddle 29 the gasket will have two differently curved surfaces to make its thickness reducing from both ends, so that pressure will be firm all along the peripheral rib, or opposite peripheral ribs if both faces are ribbed. The straight end rib portions 42 give firm support. The gasket 31 in FIG. 3 could be the same, but lateral firmness here is not so important. If special contouring is used here (reducing thickness toward the bottoms of mismatched surfaces being sealed) the correct alignment of the gasket can be ensured by molding the gasket with a saddle curvature.

Although the springs may be stretched and hooked in place with pliers, it is easiest to use a simple hooked tool. In either event, mounting is much faster than with previous mounting systems. A worker can hold the sparger with one hand, apply a gasket over the boss 36 with the other hand and with the hand originally holding the sparger place it against the header, with the boss 36 extending snugly into the hole 17. Now with his free hand he can hook one spring 39 of a fastener assembly into a slot 28 and drape the strap 38 and its other spring over the header 16 to a point such that he can hold both spring and sparger with one hand while with the other he hooks the tool into the free spring and, stretching it, hooks its free end into the opposite slot 28. In the case of the double sparger unit in FIGS. 1 and 2, the second spring fastener is even more easily applied, since the first one holds the sparger unit approximately in place.

The continued provision of wings 27 is desired for interchangeability of parts, especially if some purchasers should prefer to use U-Bolts. A manufacturer not concerned with that problem might choose to omit the wings and secure the hooks to the units elsewhere, or hook a spring between two ends of a band to form a closed loop embracing both header and saddle.

ACHIEVEMENT

The disclosed mounting is not only more convenient and less expensive than previous sparger mountings, it is also more dependably satisfactory. No longer is there leakage due to too little tightening of screw fastening means. No longer is there breakage due to too much tightening, with need for replacement, or sometimes undetected loss of operating efficiency. No longer is there danger of misplacement which could reduce the air flow, or in the case of double spargers with laterally extending arms, could cause unbalanced air flow due to one cluster of orifices being higher than the other and subject to less hydrostatic pressure.

We claim:

1. Submerged gas-blast apparatus including a header for connection to a source of gas under pressure while submerged in liquid in a tank, the header having a plurality of apertures along one straight longitudinal line thereof; a plurality of sparger units carried by the header with each sparger unit in alignment with one of the apertures to receive air from the header through said aperture and constructed to release the air copiously in the liquid with only moderate back pressure, characterized as follows:

each sparger unit being provided with a saddle portion and being secured to the header by spring fastening means extending from one end of the saddle around the header to the other end of the saddle and drawing the sparger unit toward the header for sealing relationship; and each sparger unit having centering projecting means extending into the aperture on which it is positioned for maintaining accurate positioning of the sparger with respect to the header and of the spargers with respect to each other.

2. Submerged gas-blast apparatus including a header for connection to a source of gas under pressure while submerged in liquid in a tank, the header having a plurality of apertures along one straight longitudinal line thereof; a plurality of sparger units carried by the header with each sparger unit in alignment with one of the apertures to receive air from the header through said aperture and constructed to release the air copiously in the liquid with only moderate back pressure, characterized as follows:

each sparger unit being provided with a saddle portion and being secured to the header by spring fastening means extending unsealingly from one end of the saddle around the header to the other end of the saddle and drawing the sparger unit toward the header for sealing relationship;

each sparger unit having centering projecting means extending into the aperture on which it is positioned for maintaining accurate positioning of the sparger with respect to the header and of the spargers with respect to each other; and a sealing gasket engaging the header's outside surrounding said centering projection means.

3. Submerged gas-blast apparatus including a header for connection to a source of gas under pressure while submerged in liquid in a tank, the header having a plurality of apertures along one straight longitudinal line thereof; a plurality of sparger units carried by the header with each sparger unit in alignment with one of the apertures to receive air from the header through said aperture and constructed to release the air copiously in the liquid with only moderate back pressure, characterized as follows:

each sparger unit being provided with a saddle portion receiving the header and having its ends extending out from the header and being secured to the header by spring fastening means, including a band and spring, extending from one end of the saddle around the header to the other end of the saddle and drawing the sparger unit toward the header for sealing relationship; and each sparger unit having centering projecting means extending into the aperture on which it is positioned for maintaining accurate positioning of the sparger with respect to the header and of the spargers with respect to each other; and the spring fastening means being readily engageable by applying the sparger unit to the header, engaging one end of the spring fastening means to one end portion of the saddle, stretching the fastening means around the header manually, and engaging its other end to the other end portion of the saddle.

4. Submerged gas-blast apparatus including a header for connection to a source of gas under pressure while submerged in liquid in a tank, the header having a plurality of apertures along one straight longitudinal line thereof; a plurality of sparger units carried by the header with each sparger unit in alignment with one of the apertures to receive air from the header through said aperture and constructed to provide a short conduit extending laterally as to the axis of the aperture and to release the air copiously in the liquid with only moderate back pressure, characterized as follows:

each sparger unit being provided with a saddle portion and being secured to the header by spring fastening means extending from one end of the saddle around the header to the other end of the saddle and drawing the sparger unit toward the header for sealing relationship;

each sparger unit having centering projecting means extending into the aperture on which it is positioned for maintaining accurate positioning of the sparger with respect to the header and of the spargers with respect to each other; and the spring fastening means being readily engageable by applying the sparger unit to the header, engaging one end of the spring fastening means to one end portion of the saddle, stretching the fastening means around the header manually, and engaging its other end to the other end portion of the saddle.

5. Submerged gas-blast apparatus including a header for connection to a source of gas under pressure while submerged in liquid in a tank, the header having a plurality of apertures along one straight longitudinal line thereof; a plurality of sparger units carried by the header with each sparger unit in alignment with one of the apertures to receive air from the header through said aperture and constructed to provide short conduits extending laterally as to the axis of the aperture and to the header in opposite directions and to release the air copiously in the liquid with only moderate back pressure, characterized as follows:

each sparger unit being provided with a saddle portion and being secured to the header by a pair of spring fastening means spaced longitudinally of the header to locate the short conduits relatively between them longitudinally of the header, each fastening means extending from one end of the saddle around the header to the other end of the saddle, being engaged by means readily engageable upon manually stretching the spring, and drawing the sparger unit toward the header for sealing relationship; and each sparger unit having centering projecting means extending into the aperture on which it is positioned for maintaing accurate positioning of the sparger with respect to the header and the spargers with respect to each other.

* * * * *

UNITED STATES PATENT OFFICE
CERTIFICATE OF CORRECTION

Patent No. 3,781,000      Dated Dec. 25, 1973

Inventor(s) Cornelis W. M. Paasschens and Victor J. Nelson

It is certified that error appears in the above-identified patent and that said Letters Patent are hereby corrected as shown below:

```
Column 1, line 65, "11 on 12" should be -- 11 or 12 -- .
Column 2, line 16, "V-bolts" should be -- U-bolts -- .
Column 2, line 20, "sperture 17" should be -- aperture 17 --.
Column 4, line 26, after "extending" delete "unsealingly".
Column 4, line 31, after "extending" insert -- unsealingly --
Column 6, line 25, "maintaing" should be -- maintaining -- .
```

Signed and sealed this 9th day of April 1974.

(SEAL)
Attest:

EDWARD M. FLETCHER, JR.
Attesting Officer

C. MARSHALL DANN
Commissioner of Patents